US005642119A

United States Patent [19]

Jacobs

[11] Patent Number: 5,642,119

[45] Date of Patent: Jun. 24, 1997

[54] ELECTRONIC PARKING METER AND SYSTEM

[75] Inventor: James P. Jacobs, Phoenixville, Pa.

[73] Assignee: Intelligent Devices, Inc., Harleysville, Pa.

[21] Appl. No.: 534,893

[22] Filed: Sep. 28, 1995

Related U.S. Application Data

[63] Continuation-in-part of Ser. No. 195,300, Feb. 10, 1994, Pat. No. 5,454,461, which is a continuation of Ser. No. 98,157, Jul. 28, 1993, Pat. No. 5,407,049.

[51] Int. Cl.[6] .................. G01S 13/08

[52] U.S. Cl. .................. 342/69; 194/217

[58] Field of Search .................. 342/69, 61, 118, 342/135; 367/903, 99; 194/217; 340/932.2, 933

[56] References Cited

U.S. PATENT DOCUMENTS

| | | | |
|---|---|---|---|
| 3,211,267 | 10/1965 | Bayha . | |
| 3,968,491 | 7/1976 | Silberberg | 367/108 |
| 3,998,309 | 12/1976 | Mandas et al. . | |
| 4,139,834 | 2/1979 | Matsui et al. | 367/903 |
| 4,249,648 | 2/1981 | Meyer . | |
| 4,356,903 | 11/1982 | Lemelson et al. . | |
| 4,460,080 | 7/1984 | Howard . | |
| 4,483,431 | 11/1984 | Pratt . | |
| 4,823,928 | 4/1989 | Speas . | |
| 4,848,556 | 7/1989 | Shah et al. . | |
| 4,967,895 | 11/1990 | Speas . | |
| 5,060,777 | 10/1991 | Van Horn et al. . | |
| 5,062,518 | 11/1991 | Chitty et al. . | |
| 5,097,934 | 3/1992 | Quinlan, Jr. . | |
| 5,103,957 | 4/1992 | Ng et al. . | |
| 5,119,916 | 6/1992 | Carmen et al. . | |
| 5,153,586 | 10/1992 | Fuller . | |
| 5,259,491 | 11/1993 | Ward, II . | |
| 5,260,910 | 11/1993 | Panton | 367/99 |
| 5,266,947 | 11/1993 | Fujiwara et al. . | |
| 5,321,241 | 6/1994 | Craine . | |
| 5,366,404 | 11/1994 | Jones . | |
| 5,442,348 | 8/1995 | Mushell | 194/217 |

FOREIGN PATENT DOCUMENTS 2 077 475 12/1981 United Kingdom .

*Primary Examiner*—Daniel T. Pihulic
*Attorney, Agent, or Firm*—Caesar, Rivise, Bernstein, Cohen & Pokotilow, Ltd.

[57] ABSTRACT

A low-powered electronic parking meter which can be powered solely by non-rechargeable, commercially available batteries. The meter includes a coin receptor with unique means for coin detection, slug detection, determination of coin denomination, and jam detection, which require very little power. The coin detection and denomination determination are performed using pivotable lever arms in contact with Piezo strips. The slug detection uses a permanent magnet mounted opposite a reed switch and the jam detection is performed by IR diode emitters and photocells. The meter also includes processing means, a liquid crystal display, a sonar transducer or alternatively an RF transmitter and receiver (RADAR) for detecting the presence of vehicles, and an IR transceiver enabling parking authority personnel to communicate with the meter. The components of the meter are operated in three conditions or states including an off state, an inactive state, and an active state, to provide further conservation of power so that the meter is entirely operated by non-rechargeable batteries.

16 Claims, 14 Drawing Sheets

ELECTRONIC PARKING METER AND SYSTEM

This a Continuation-In-Part Application of application Ser. No. 08/195,300 filed on Feb. 10, 1994, which has matured into U.S. Pat. No. 5,454,461, issued on Oct. 3, 1995, which is a continuation application of application Ser. No. 08/098,157 filed on Jul. 28, 1993 which has matured into U.S. Pat. No. 5,407,049, issued on Apr. 18, 1995.

BACKGROUND OF THE INVENTION

This invention relates generally to parking meters and systems and more specifically to electronic parking meters and systems.

Parking meters permit vehicles to be parked on streets for an allowable time determined by the number and denominations of coins which are placed in the parking meter. A clock mechanism in the parking meter runs down the allowable time until it reaches zero, and an overtime parking indication appears.

The coin receiving devices of the parking meters perform various tests to determine whether an acceptable coin has been inserted, and the denomination of the coin. Circuitry which tests for the presence of ferrous material (i.e., slugs) includes Hall-effect sensors, and frequency shift metallic detectors. The denomination is determined by devices which measure the diameter of the coin such as infra-red emitting diodes and photo-diodes, or which measure the weight of the coin using strain gauges, and the like.

Coin receiving mechanisms which use IR detectors, Hall-effect circuitry, magnetic fields and light sensing rays with microprocessors include U.S. Pat. No. 4,483,431 (Pratt); U.S. Pat. No. 4,460,080 (Howard); U.S. Pat. No. 4,249,648 (Meyer) and U.S. Pat. No. 5,119,916 (Carmen et al.).

In recent years, electronic parking meters and systems have been developed which use microprocessors in conjunction with electronic displays, IR transceivers to communicate with auditors, and ultrasonic transceivers to determine the presence of vehicles at the parking meter. U.S. Pat. Nos. 4,823,928 and 4,967,895 (Speas) disclose electronic parking meters which use microprocessors, electronic displays, IR transceivers, solar power and sonar range finders.

The sophisticated devices which use microprocessors, electronic displays and IR and ultrasonic transducers consume too much power to operate by non-rechargeable batteries alone. Thus, the Speas' patents disclose the use of solar power cells which charge capacitors or rechargeable batteries.

Various problems exist with the use of solar power sources including the use of parking meters in shady areas, or the use of parking meters during periods in which there is very little sunlight. This causes the rechargeable batteries to run down, and they require frequent replacement. Or, in the case of the use of capacitors, the lack of power causes the meter to become inoperative.

There is therefore a need for an electronic parking meter, with a microprocessor, electronic display, ultrasonic and IR transceivers, which is specifically designed for low power drainage so that it can operate for extended periods of time with ordinary batteries. The parking meter of this invention utilizes unique low-power coin sensing and detecting devices and circuitry as well as several conditions or states of operation to minimize power requirements in usage. This enables the electronic parking meter to operate strictly on battery power utilizing non-rechargeable commercially without the use of unreliable solar power sources, the requirement to run and connect power cables to the meters, or to use rechargeable batteries which are expensive, and require central recharging facilities.

OBJECTS OF THE INVENTION

Accordingly, it is the general object of this invention to provide an electronic parking meter which improves upon, and overcomes the disadvantages of the prior art.

It is a further object of this invention to provide an electronic parking meter with unique coin sensing and detection circuitry which is simple, inexpensive, and uses very little power.

It is still a further object of this invention to provide an electronic parking meter which operates in several states to minimize power consumption.

It is yet a further object of this invention to provide an electronic parking meter which utilizes a vehicle detector to determine the presence of a vehicle at the parking meter.

It is still yet a further object of this invention to provide an electronic parking meter with an electronic display which shows allowable time and which resets the allowable time to zero when the vehicle at the parking meter location is removed.

It is another object of this invention to provide an electronic parking meter which has automatic diagnostic testing to determine the presence and category of failures.

It is still another object of this invention to provide an electronic parking meter which enables an auditor to receive stored information relating to the value of the coins deposited, the amount of overtime parking, and the operational status of the meter for central processing.

It is yet another object of this invention to provide an electronic parking meter with an electronic display which incorporates a flashing signal to indicate overtime parking.

It is still yet another object of this invention to provide an electronic parking meter which enables a parking enforcement officer to communicate with the meter.

It is an additional object of this invention to provide an electronic parking meter which is capable of operating with standard non-chargeable batteries for approximately one to two years before required replacement.

SUMMARY OF THE INVENTION

These and other objects of this invention are achieved by providing an electronic parking meter which has an electronic display, an ultrasonic transceiver or alternatively a RADAR (RF transmitter and receiver) to determine the presence of vehicles, an IR transceiver for communicating information to and from parking enforcement officers and auditors, and a flashing signal to indicate overtime parking. The meter is designed for very low power drain to enable the use of common batteries only for extended periods of time without the requirement for external power cables or solar power systems.

The coin sensing and discrimination circuitry requires very little power. It comprises a coin pre-sensor, a coin diameter measuring device, a ferrous coin (i.e., slug) detector and a coin jam detector. The pre-sensor uses a lever mechanism to deflect or flex a Piezo electric strip, as does the coin diameter measuring device. The coin ferrous detector uses a permanent magnet and a reed switch. When a coin with ferrous material passes between the magnet and the reed switch, it affects the magnetic field, thereby releasing the reed switch. The coin jam detector comprises IR diode emitters and photo-electric cell receivers to detect the presence of a jam in the coin slot. Also, the meter and its components operate in several states including off, inactive and active states to further minimize power requirements.

DESCRIPTION OF THE DRAWING

Other objects and many of the intended advantages of this invention will be readily appreciated when the same becomes better understood by reference to the following detailed description when considered in connection with the accompanying drawing wherein.

DETAILED DESCRIPTION OF THE PREFERRED EMBODIMENT

Figure 1:
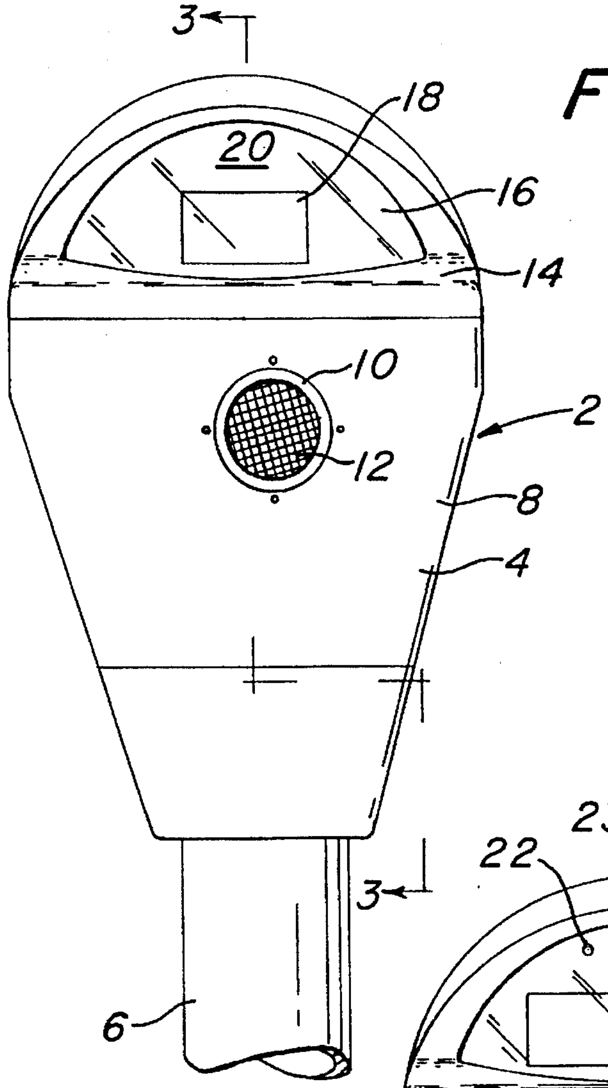
FIG. 1 is a rear elevation view of the parking meter of this invention.
Figure 2:
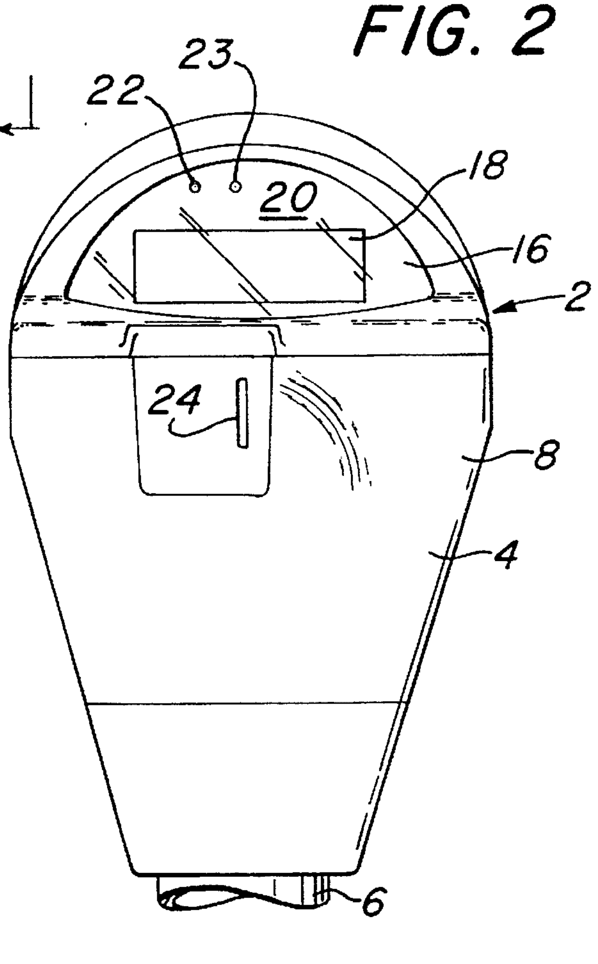
FIG. 2 is a front elevation view of the parking meter.

Referring now in greater detail to the various figures of the drawing, wherein like reference characters refer to like parts, there is shown in FIGS. 1 and 2 the parking meter 2 constructed in accordance with this invention.

The parking meter 2 comprises a clam shell shaped member 4 which is mounted on a stanchion 6. The member 4 has a lower portion 8 with an opening 10 at its rear which is covered by a protective mesh 12. As will be explained later, a sonar transducer is mounted behind the protective mesh 12 to detect the presence of vehicles at the parking meter location.

The clam shell shaped member 4 also has an upper portion 14 which comprises a window 16 for viewing an electronic LCD display 18. The LCD display 18 is mounted on a board 20 which holds the electrical and electronic components of the system. The board has openings 22 and 23 behind which are mounted an IR transceiver for receiving information from, and conveying information to, parking authority enforcement and auditor personnel, as will be explained in detail later. Finally, a coin slot 24 is mounted in the front of the lower portion 8 of the member 4.

Figure 3:
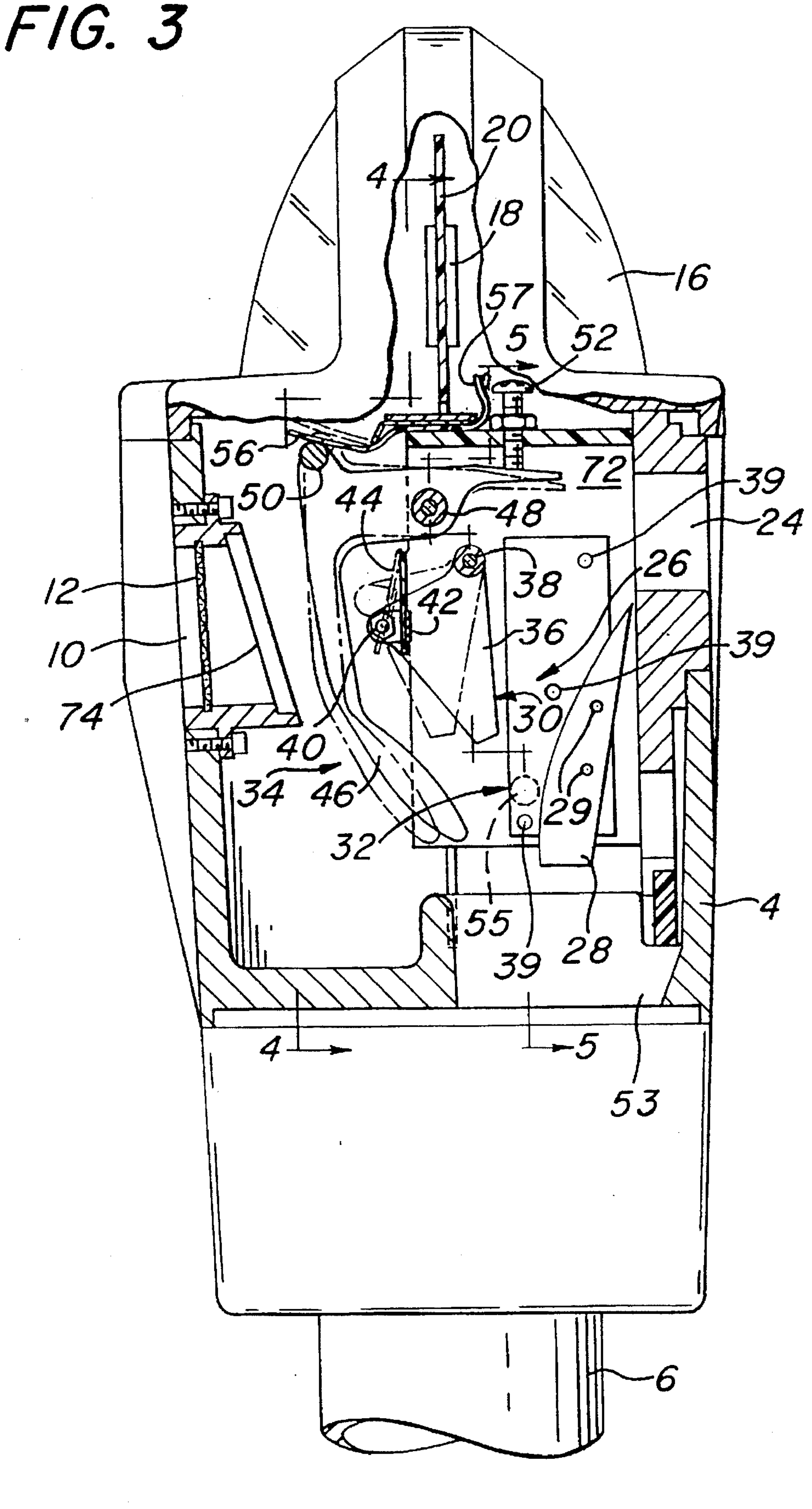
FIG. 3 is a side view, partially in section, of the parking meter taken along the lines 3—3 of FIG. 1.
Figure 4:
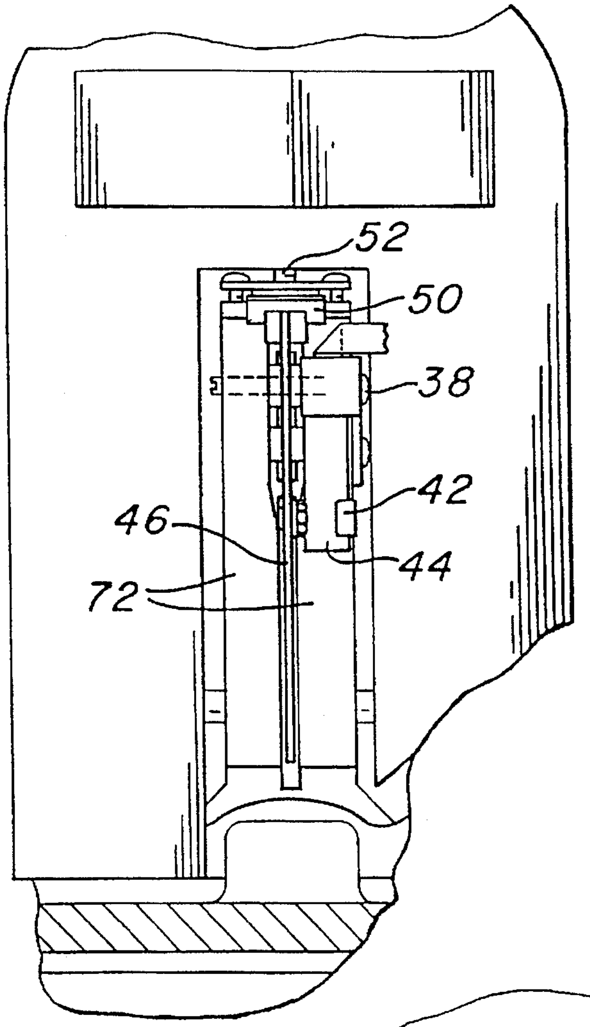
FIG. 4 is a sectional view of the invention taken along the lines 4—4 of FIG. 3.
Figure 5:
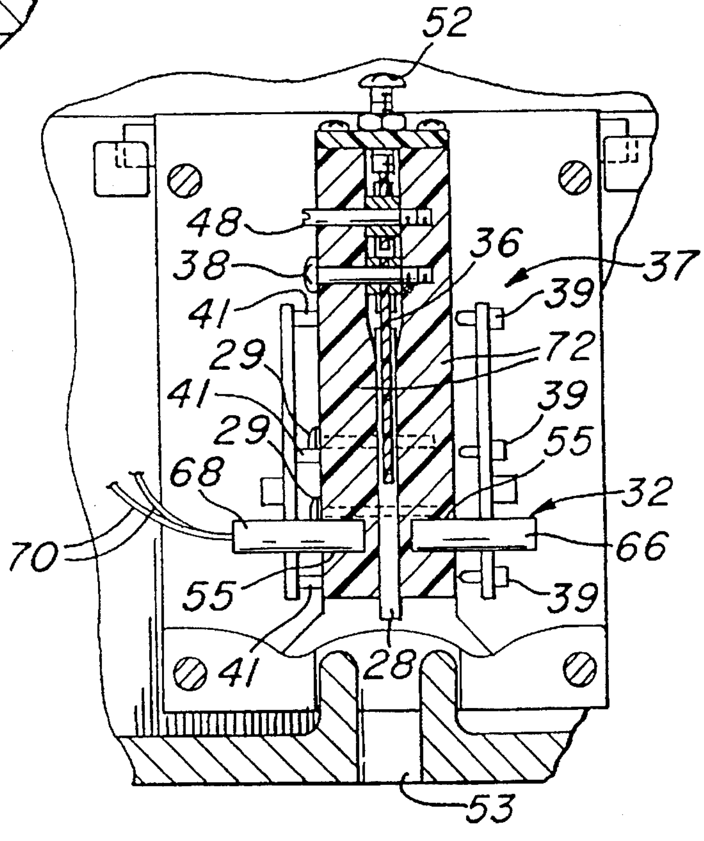
FIG. 5 is a sectional view of the parking meter taken along the lines 5—5 of FIG. 3.

FIGS. 3–5 show the mounting of the various components within the area enclosed by the clam shell shaped member 4. The coin slot 24 provides entry for coins into a chute 26. A stationary guide member 28, mounted by screws 29 in one of a pair of transparent plastic blocks 72 (see FIG. 5), defines one boundary of the chute 26 and directs the coin downward as shown by the arrow.

The coin sensing and detecting circuitry comprises four principal elements: a pre-sensor 30, a ferrous material or slug detector 32, a coin size detector 34, and a coin jam detector 37. The pre-sensor 30 comprises a pivotable pre-sensor arm 36, a pivot 38 and a screw 40 mounted on the pre-sensor arm 36. The screw 40 holds a bracket 42 through which a Piezo mylar strip 44 has been placed. As will be explained later, the deflection of the pre-sensor arm 36 causes the bracket 42 to move and flex the Piezo strip 44 creating a current which is detected by a processor to alert the equipment that a coin has been inserted into the coin slot 24.

The slug detector 32 comprises a permanent magnet 66 mounted in the hole 55 and a reed switch 68 mounted opposite the permanent magnet 66 in the blocks 72. The coin size detector 34 comprises a pivotable size measurement arm 46, a pivot 48 and a screw 50. The screw 50 is in contact with a Piezo strip 56. The jam detector 37, (FIG. 5) comprises IR emitters 39 and photo-cells 41, which are also mounted on plastic blocks 72, as are the pre-sensor 30, and the coin size detector 34.

At this time, the operation of the coin sensing and detection system will be described. When a coin is inserted into the slot 26, it proceeds to progress downward through the chute 26 and is deflected by the guide member 28 so that it impinges upon a pre-sensor arm 36. The pre-sensor arm 36 rotates about the pivot 38 into the position shown in dashed lines in FIG. 3. The screw 40 mounted on the pre-sensor arm 36 moves the bracket 42 which flexes the Piezo strip 44.

This flexation of the Piezo strip 44 causes an electrical current to be generated which is detected by the processor of the system. As will be explained in detail later, this enables the processor to activate electronic circuitry which has been off or in an inactive state, so that it may process the signals it receives from the remainder of the coin detection circuitry of the meter 2.

After pre-detection takes place, the coin progresses further down chute 26 until it passes the slug detector 32, between a permanent magnet placed in a hole 55 in one of the two blocks 72 made of clear plexiglass or similar material, and the reed switch 62.

The reed switch 62, positioned in a second hole 55 in the second block 72, is normally held in the operative position by the magnetic field of the permanent magnet. As the coin passes between the permanent magnet 66 and the reed switch 68, if the coin is a slug, i.e., it possesses ferrous material, the field will be broken and the reed will drop out causing an electrical pulse to be sent to the processor.

After slug detection has taken place, the coin then deflects the size measurement arm 46. The amount of the deflection of the size measurement arm 46 is a function of the diameter of the coin. The arm 46 rotates about pivot 48 which causes a screw 50, mounted on the arm 40 to move as shown by the dashed lines of FIG. 3 to flex the Piezo strip 56. This causes a current to flow in conductors 57 attached to the Piezo strip 56, which is proportional to the flexing of the Piezo strip 56, thereby indicating to the processor the size or denomination of the coin which has been inserted in the slot 24. The coin then progresses out of the chute 26 through an opening 53, where it is held within the meter 2.

If the chute 26 is jammed, by a coin or other material, the light between one or more of the IR emitters 39 and its associated photo-cell(s) 41, is broken, thereby signalling the processor that a jam has occurred, as will be explained in detail later.

The coin detection circuitry of this invention is unique in that it requires almost no standby power as compared to similar existing devices. Therefore, the system may operate entirely by the use of non-rechargeable batteries with an operating life of 6 months or longer as compared to existing systems which use either a source of external power or require solar power cells which depend on continuous sunlight to maintain power.

Also shown in FIG. 3, a sonar transducer 74 is mounted behind the protective mesh 12 so that it can transmit and receive through the opening 10. It is angled downward to transmit toward the parking area adjacent the meter 2, to detect the presence of vehicles.

Referring now to FIGS. 4 and 5, which show additional sectional views of the meter 2, it can be seen that the chute 26 is defined by the opening between the blocks 72. Also within that opening, are the pivotally mounted arms 36 and 46. A set screw 52 (see FIGS. 3–5) provides a zero set position for the size measurement arm 46. Screws 29 hold the stationary guide member 28 in place.

The IR emitters 39, and the photo-cells 41 of the coin jam detector 37 are shown mounted on respective boards opposite each other so that light from the emitters 39 can flow through the transparent blocks 72 to the photo-cells 41. As explained previously, any coins or other material jammed in the chute 26 will block the light to one or more of the receivers 41, thereby indicating a jam.

Figure 6A:
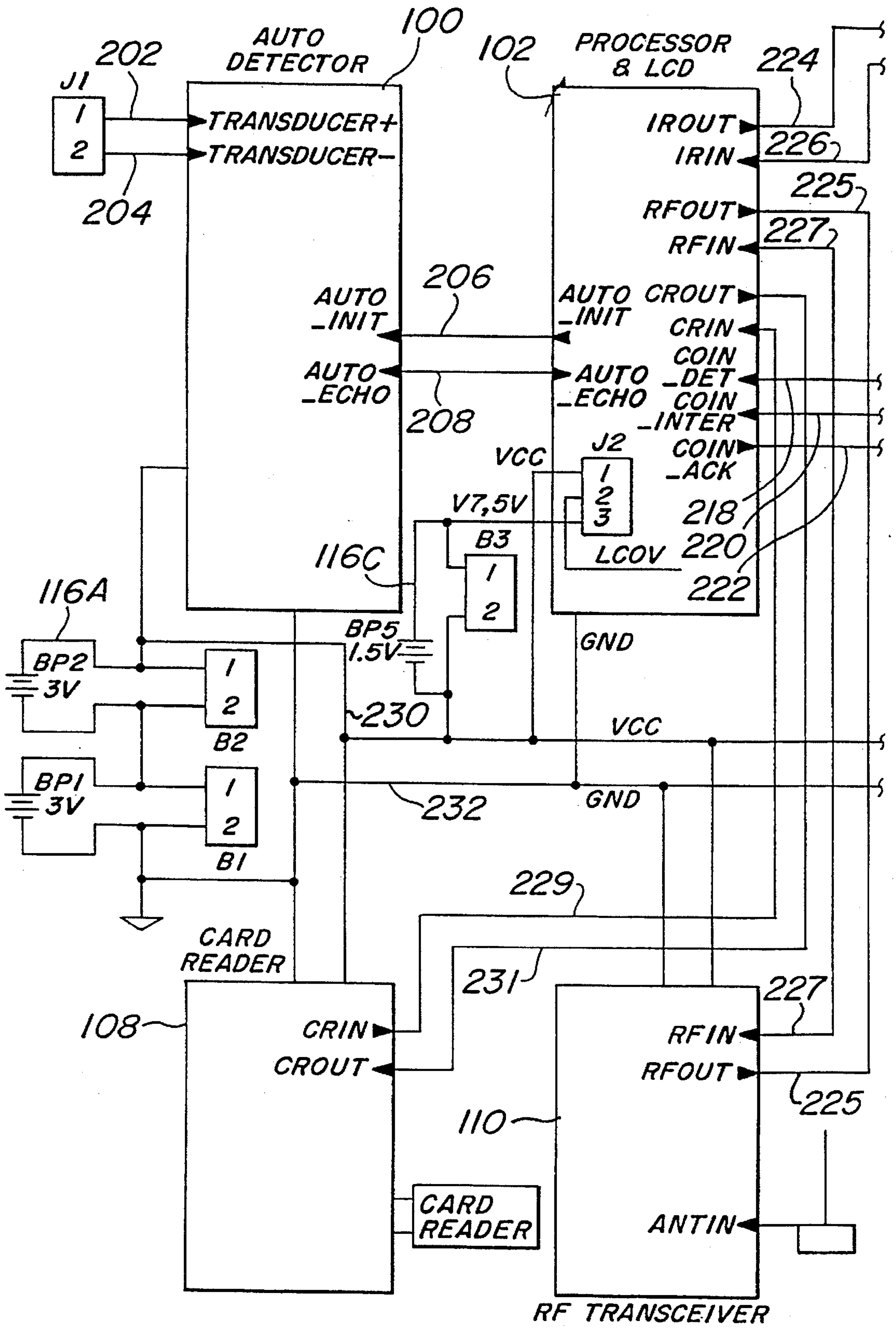
FIGS. 6*a* and 6*b* show an overall block diagram of the electrical and electronics portion of the parking meter.
Figure 6B:
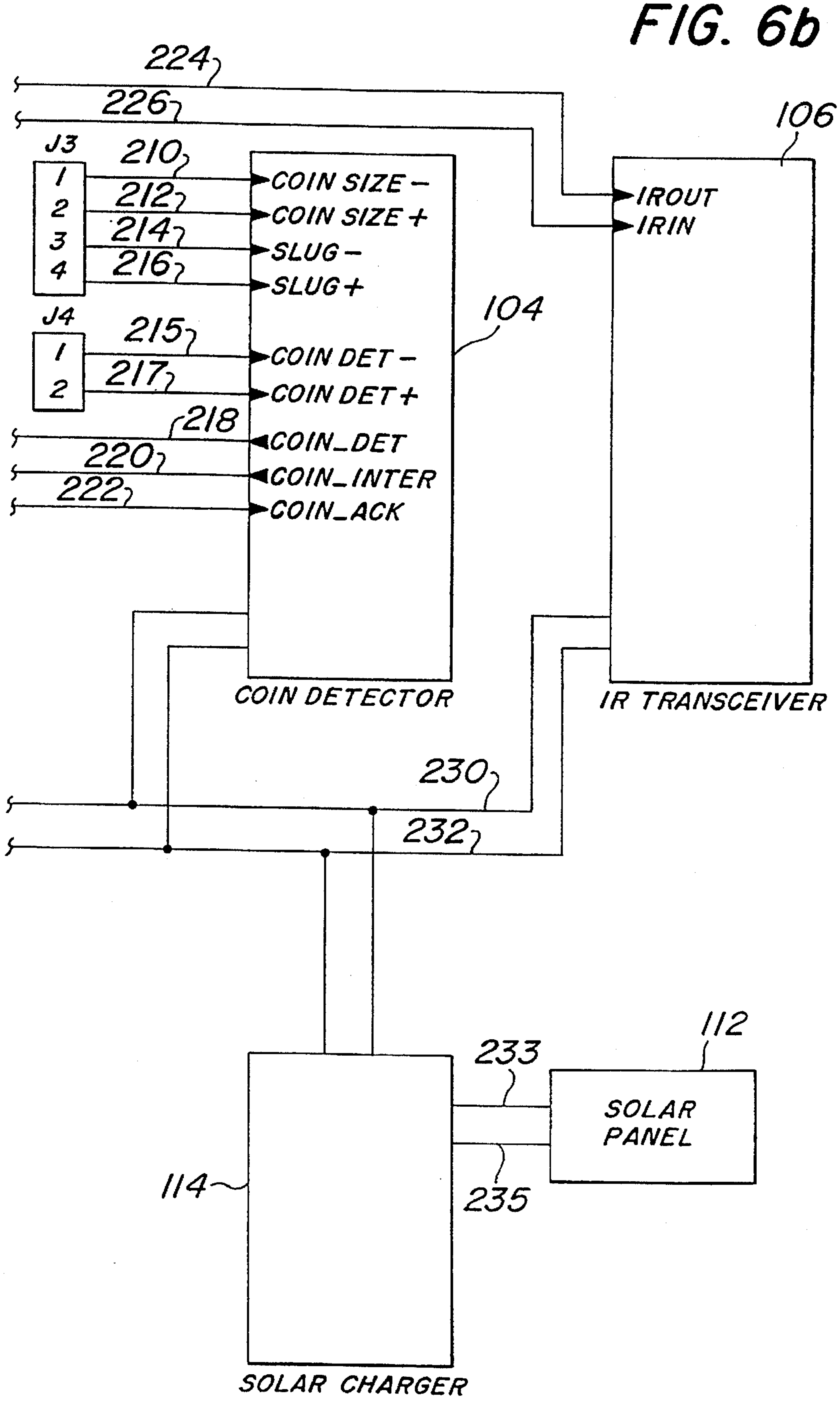

The electrical and electronic circuitry of the parking meter 2 will now be described. FIGS. 6*a* and 6*b* show an overall block diagram of the circuitry. Auto detector 100 comprises the sonar transducer 74 which receives power from a connector J1 on lines 202 and 204. In order to conserve power to enable the use of a power source comprising batteries only, the transducer 74 is only turned on every ten to fifteen seconds for a few microseconds. It generates a half-millisecond pulse and then waits for approximately 50 milliseconds for a return echo. The auto detector 100 is initiated by a command signal (AUTO INIT) from a processor/LCD 102 on line 206. If the auto detector 100 receives a return echo indicating that a vehicle is present at the parking location, a signal (AUTO ECHO) is sent back to the processor/LCD 102 on line 208.

The processor/LCD 102 also receives input from, and transmits information to, coin detector circuitry 104 (see FIG. 6*b*). The coin detector circuitry 104 receives signal input from the Piezo strip 56 which measures coin size and from the reed switch 62 for slug detection on lines 210, 212, 214 and 216, respectively. The pre-sensor coin detector 30 receives signal input from the Piezo strip 44 on lines 215 and 217.

The coin detector 104 sends an analog coin detect signal, on line 218, to the processor/LCD 102. This signal is caused by the deflection of arm 40, causing Piezo strip 56 to generate a voltage proportional to the diameter of the coin. Signal (COIN INTER) is then sent to the processor/LCD 102 on line 220 to inform the processor that it should determine coin size.

After the processor/LCD 102 has completed its functions with regard to the coin, it sends a coin acknowledgement signal (COIN ACK) on line 222 back to the coin detector circuitry 104 to reset the coin detector so that it can accept and process subsequent coins.

In addition, the processor/LCD 102 receives information from, and sends information out to, an IR transceiver 106 on lines 224 and 226, respectively.

Other inputs and outputs shown in FIGS. 6*a* and 6*b* for the processor/LCD 102, include input/output facilities for an R.F. transceiver 110 on lines 225 and 227 and for a card reader 108 on lines 229 and 231 for the use of a credit card in conjunction with, or in place of, a coin input. A solar panel 112, connected to a solar charger 114 on lines 233 and 235, may also be provided where sunlight is sufficient to operate the meter.

The R.F. transceiver 110 may be provided to communicate with a grid (not shown), in cases of meter failure, meter jam, or overtime parking conditions, which in turn transmits to a central facility so that repair or enforcement personnel may be dispatched. Typically, a series of repeaters, each covering an eight square block area, could be used to communicate from any parking meter to the central facility.

Also shown in FIG. 6*a* is the power source for the system which has four 1½-volt batteries, 2 batteries each designated as 116A and 116B, which provide 6 volts VCC and ground on buses 230 and 232, respectively. In addition, a 1½ volt battery 116C, may be strapped in to provide 7½ volts to the LCD display, which may require the additional voltage in extremely cold weather.

Figure 7:
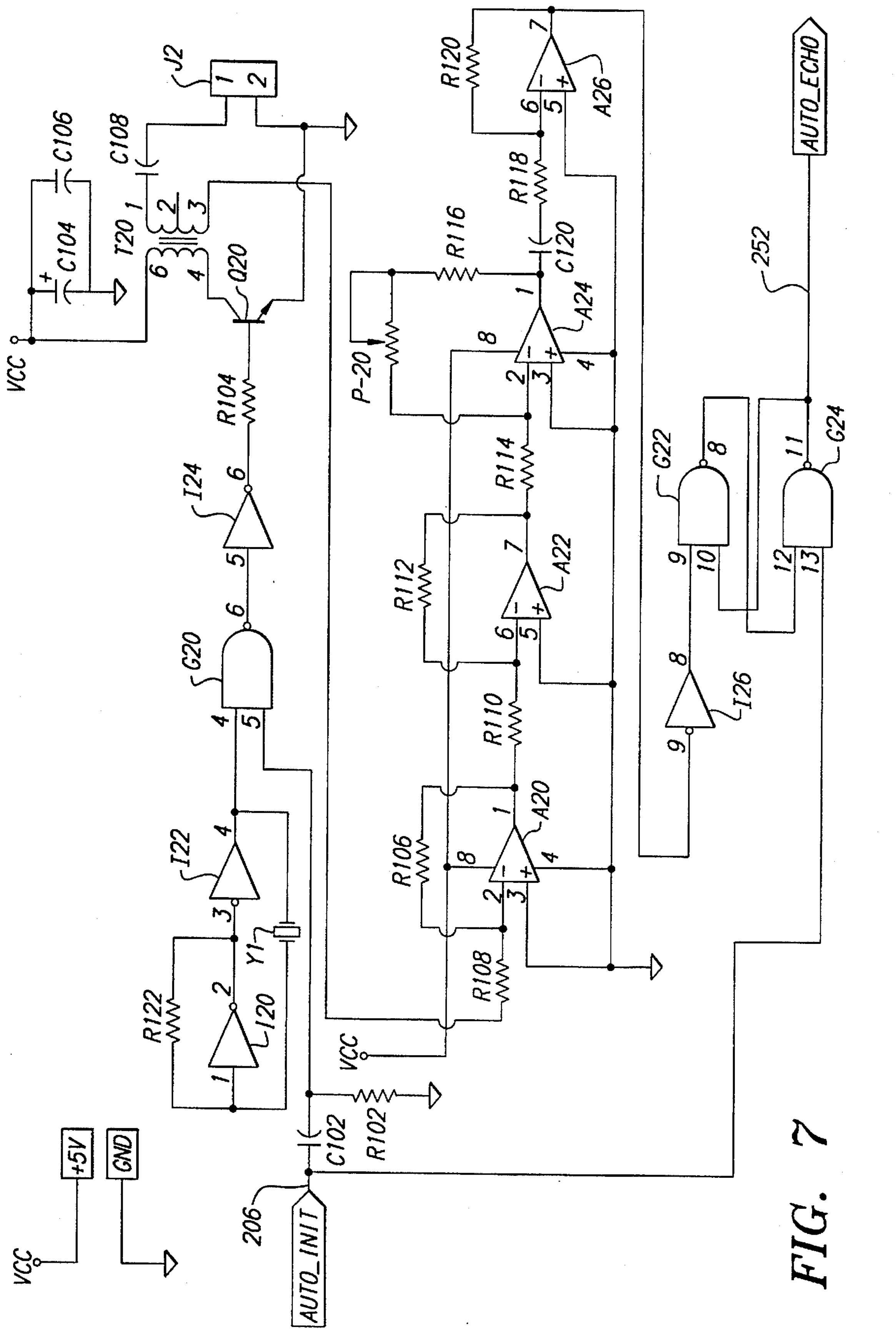
FIG. 7 shows, in schematic form, the auto detector of the parking meter of this invention.

FIG. 7 shows the circuitry of the auto detector 100. The AUTO_INIT signal comes from the processor 102, pin 34. The AUTO_INIT signal on line 206 from the processor 102 starts an auto detect cycle. When AUTO_INIT is in the low state, gate G20 is disabled, and the flip flop comprised of gates G22 and G24 is held reset.

When AUTO_INIT is brought high by the processor 102, the flip flop will be enabled to be set, and gate G20 will be open for a period of approximately 400 micro-seconds, set by capacitor C102 and resistor R102, and allow the 50 KHz square wave from the oscillator to be applied to the base of transistor Q20. Transistor Q20 applies the 50 KHz signal to transformer T20. The secondary of isolation transformer T20 applies the 50 KHz signal, through the isolation capacitor C108 to the ultrasonic transducer attached to connector J2. This 50 KHz signal applied to the transducer is transmitted as a sound burst. After the transmitted burst, the circuit will wait for either a receive echo or a timeout. If an echo is received by the transducer, it will be applied through T20 to the receiver comprising operational amplifiers A20 and A22 and A24 and A26. The amplified signal out of A26 pin 7 is used to set the flip flop comprising G22 and G24. The output of this flip flop, AUTO_ECHO at G24 pin 11, is sent to the processor 102 on line 252 to interrupt the processor 102 on pin 29.

When the microprocessor is interrupted by the AUTO_ECHO signal it will calculate the distance to the object that returned the transmit signal by calculating the time from the original AUTO_INIT signal to the AUTO_ECHO signal. When the AUTO_ECHO signal is received the microprocessor will also drop the AUTO_INIT signal which will reset flip flop G22 and G24 which will remove the AUTO_ECHO from the processor. The entire auto detect circuit will now be in its quiescent condition waiting for the next auto detect cycle. The time between cycles is determined by software and will vary depending on external conditions. If no AUTO_ECHO is received within 50 milliseconds, the microprocessor will time out and remove the AUTO_INIT signal thereby ending the cycle.

The oscillator which comprises a ceramic resonator-/1 with a circuit comprising inverters 120 and 122, generates the basic 50,000 frequency applied to the transformer T2.

The circuitry of the auto detector 100 of FIG. 7 is an improvement over the auto detector circuit of the parent application to this application Ser. No. 08/098,157 filed on Jul. 28, 1993. It allows for operation of the parking meter over a wider range of temperatures and battery voltages, and operates with approximately one-half of the power the previous circuit.

By definition, a vehicle is detected if the distance reading is three to eight feet, and a consistent reading for three consecutive transmissions is required.

Figure 8A:
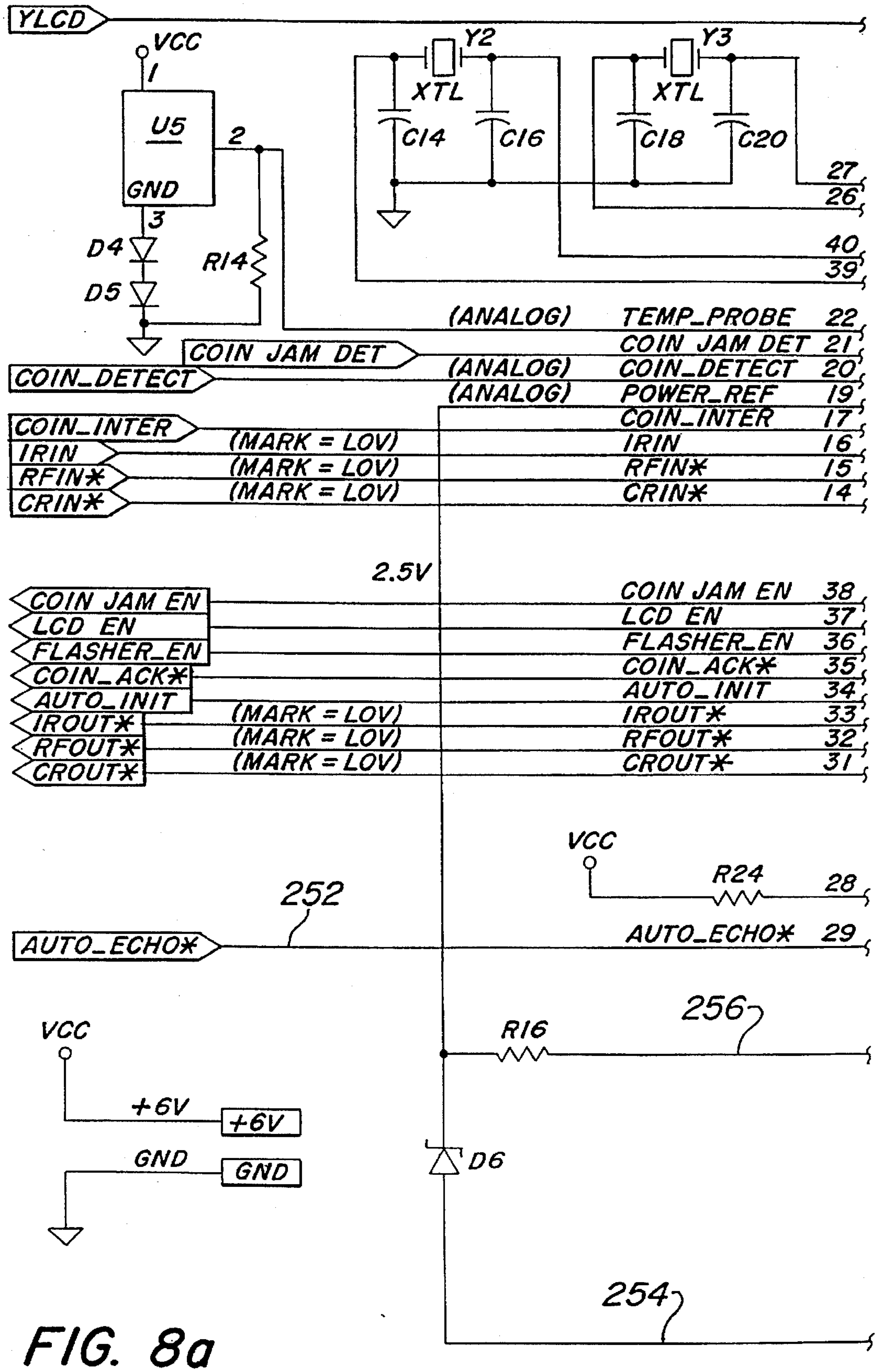
FIGS. 8*a* and 8*b* show, in schematic form, the processor portion of the parking meter.
Figure 8B:
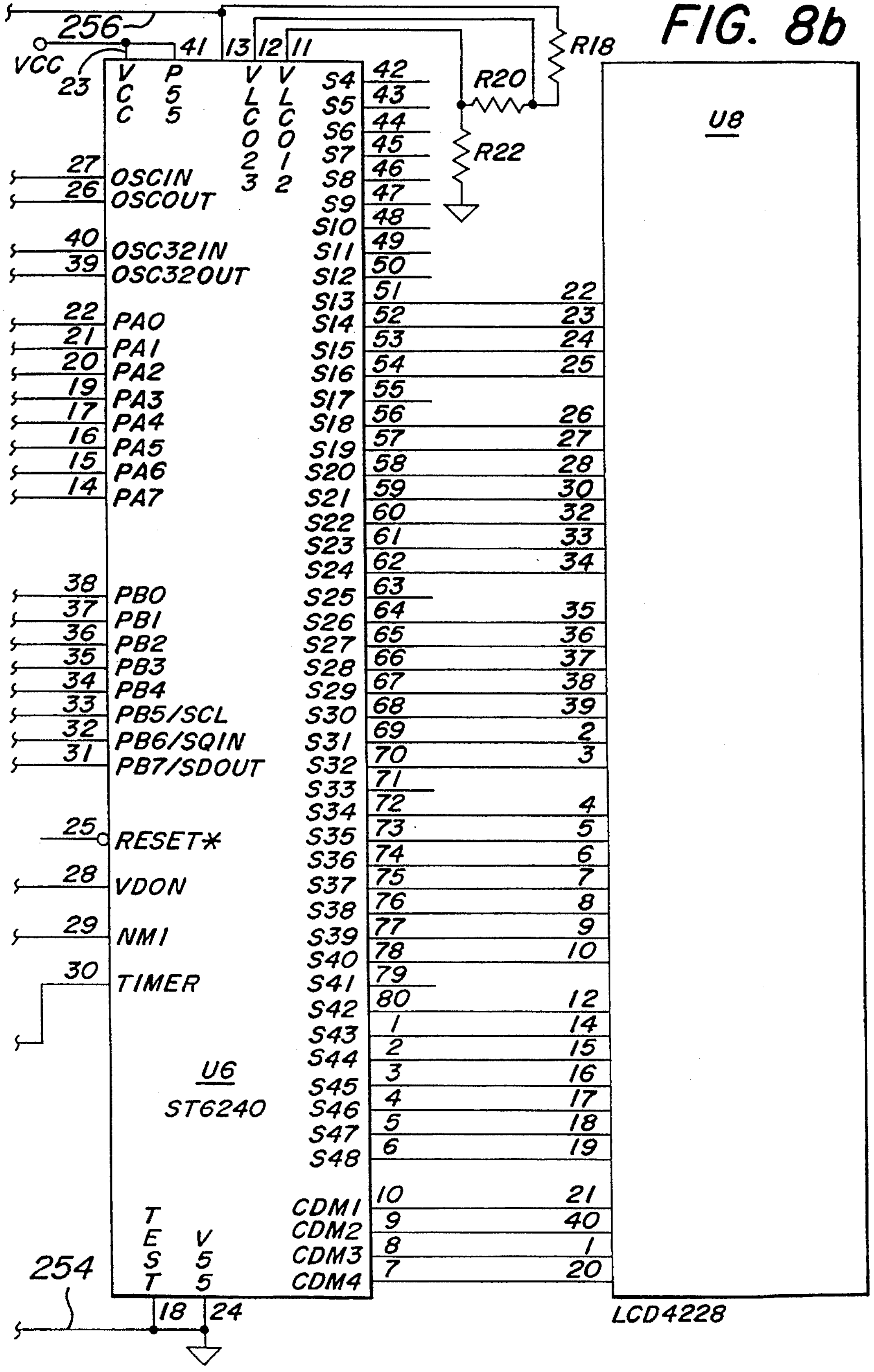

The operation of the processor/LCD 102 will now be explained. Referring now to FIGS. 8*a* and 8*b*, the processor comprises 8*k* of internal ROM and 192 bytes of internal RAM. In addition, the processor has two parallel eight bit I/O ports, any of which could be interrupt inputs. The processor also has a direct drive to the LCD display which will be used to display time and information concerning the operation and status of the parking meter.

U5 is a temperature sensor which, together with diodes D4 and D5 and resistor R14 (100K), is used by the processor/LCD 102 to determine the temperature of the meter in order to adjust any parameters that are sensitive to changes in temperature. Zener diode D6 and resistor R16 (100K) provide a reference voltage to the micro-controller to determine the battery voltage level and to report when a battery falls below a predetermined level. To further conserve power, although this zener diode D6 draws very little current (22 micro-amps on average), the power to the zener diode is turned off when the power is removed from the LCD display. The power reference voltage is connected to pin 19 of the processor/LCD 102 chip U6.

The power to the LCD display is turned on and off by the processor/LCD 102. In order to turn on the LCD display, the processor/LCD 102 makes the voltage at pin 37 of processor/LCD 102, chip U6, positive. This turns on transistors Q5 and Q6 applying power (VLCD) to the LCD display (See FIG. 9). Although the processor/LCD 102 has an internal resistor network to power the LCD display 18, if the battery voltage drops below 4.5 volts, it is necessary to have an external resistor network to deliver one micro-amp of current. This network comprises resistors R18 (1M), R20 (1M) and R22 (1M). Jumper J2 (FIG. 9) is used to apply either 6 volt battery or 7.5 volt battery to the LCD depending on which one is required. Resistor R25 (220K) is used to pull up the watchdog timer to force the processor/LCD 102 to use the software watchdog timer.

There are two crystals attached to the processor/LCD 102. These are crystal Y3 which provides a base oscillator of 1.8432 MHZ when the micro-controller is awake, and crystal Y2 which provides 32.6768 KHZ which is used to keep the LCD display and the watchdog timer active when the micro-controller is asleep. Each side of the crystal Y2 is connected to ground via capacitor C14 (15 pF) and capacitor C16 (15 pF), respectively. Similarly, each side of crystal Y3 is connected to ground via capacitors C18 (15 pF), and C20 (15 pF).

Figure 9:
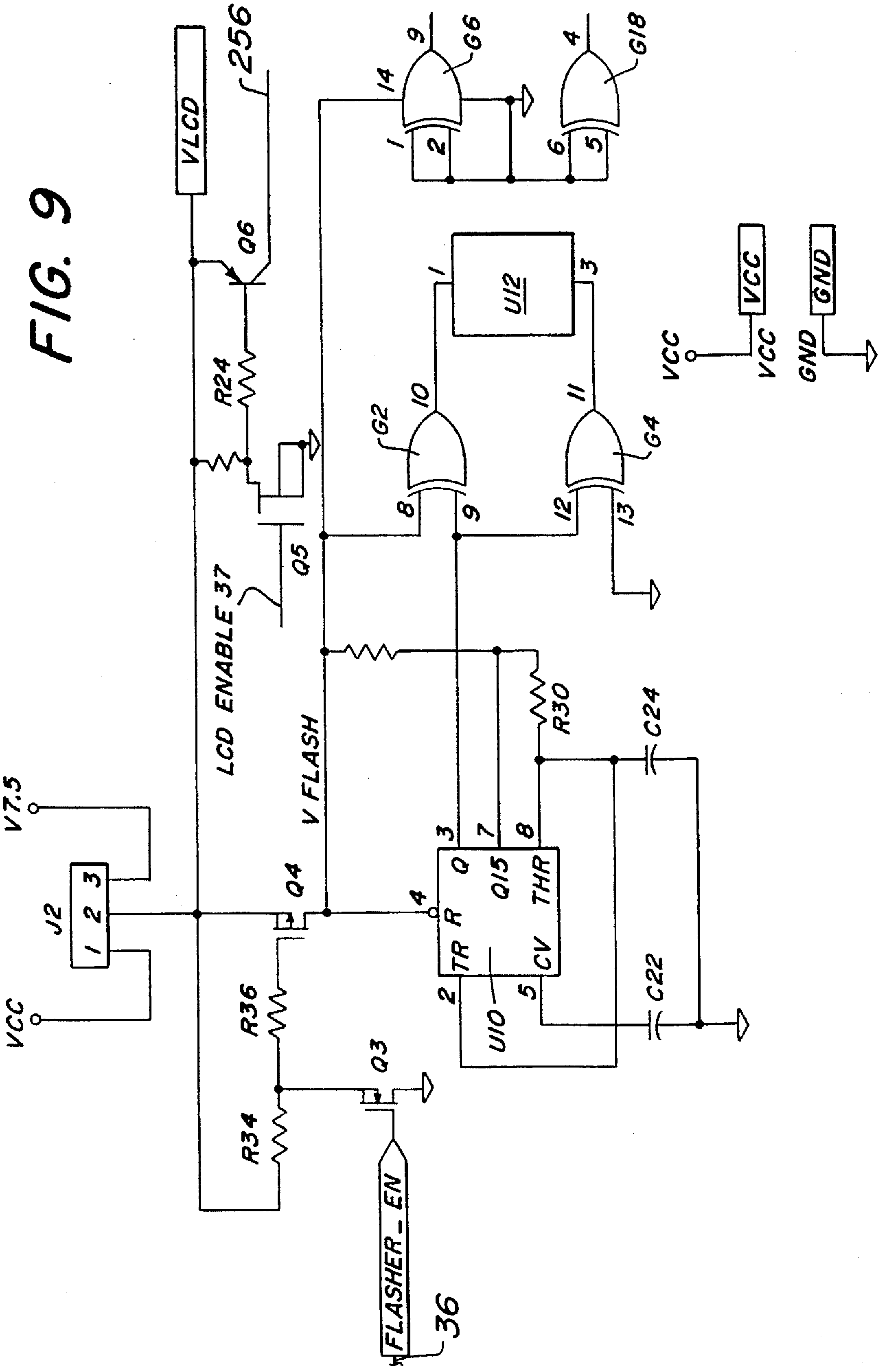
FIG. 9 is a schematic of the circuitry which controls the red display (LCD) flasher of the parking meter.

The circuitry to control the red LCD flasher to alert the parking authority when a vehicle is parked at a meter and the time has expired is also shown in FIG. 9. If there is no vehicle parked at the meter, or if there is a vehicle parked with time on the meter, the flasher will be off. If the parking meter detects a problem within itself, it will turn the flasher on solid in order to alert the parking enforcement officer. The LCD flasher must never have a DC voltage applied to it. Therefore, chip U10, with resistors R30 and R32 (536K and 100K, respectively) and capacitors C22 and C24 (each 0.01 uF) is set up as a 100 cycle multi-vibrator. Gates G2 and G4 are used as a buffer and invertor, respectively, in order to always have opposite polarity applied to the back plate and segments of the flasher U12. In order to conserve power, whenever the flasher is flashed off or turned off, the power (V FLASH) is removed from the entire circuit. When pin 38 is (FLASHER EN) deactivated, transistor Q3 is turned off which then turns off transistor Q4 and removes power from the entire flasher circuit. Resistors R34 and R36 (1M and 220K, respectively) limit the current flow through the transistors Q3 and Q4 when they are on.

Figure 10:
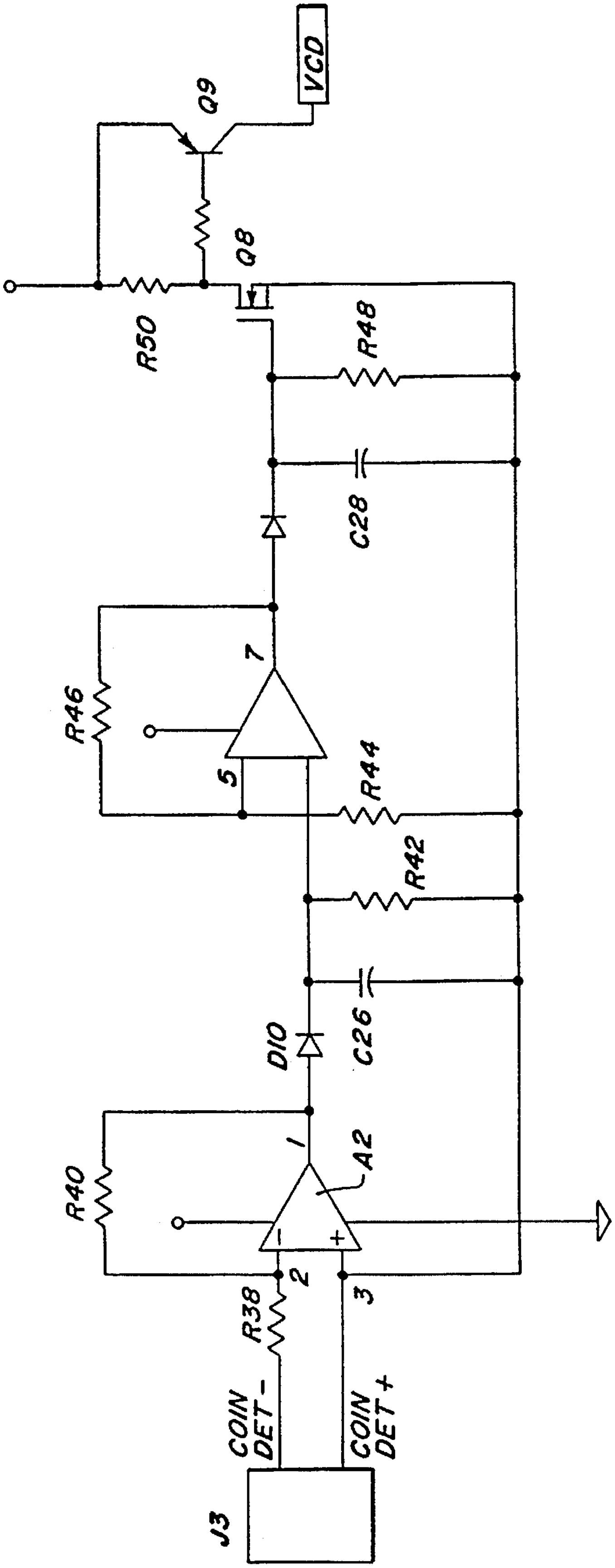
FIG. 10 is a schematic of the pre-detection section of the coin detector circuitry of the parking meter.
Figure 11:
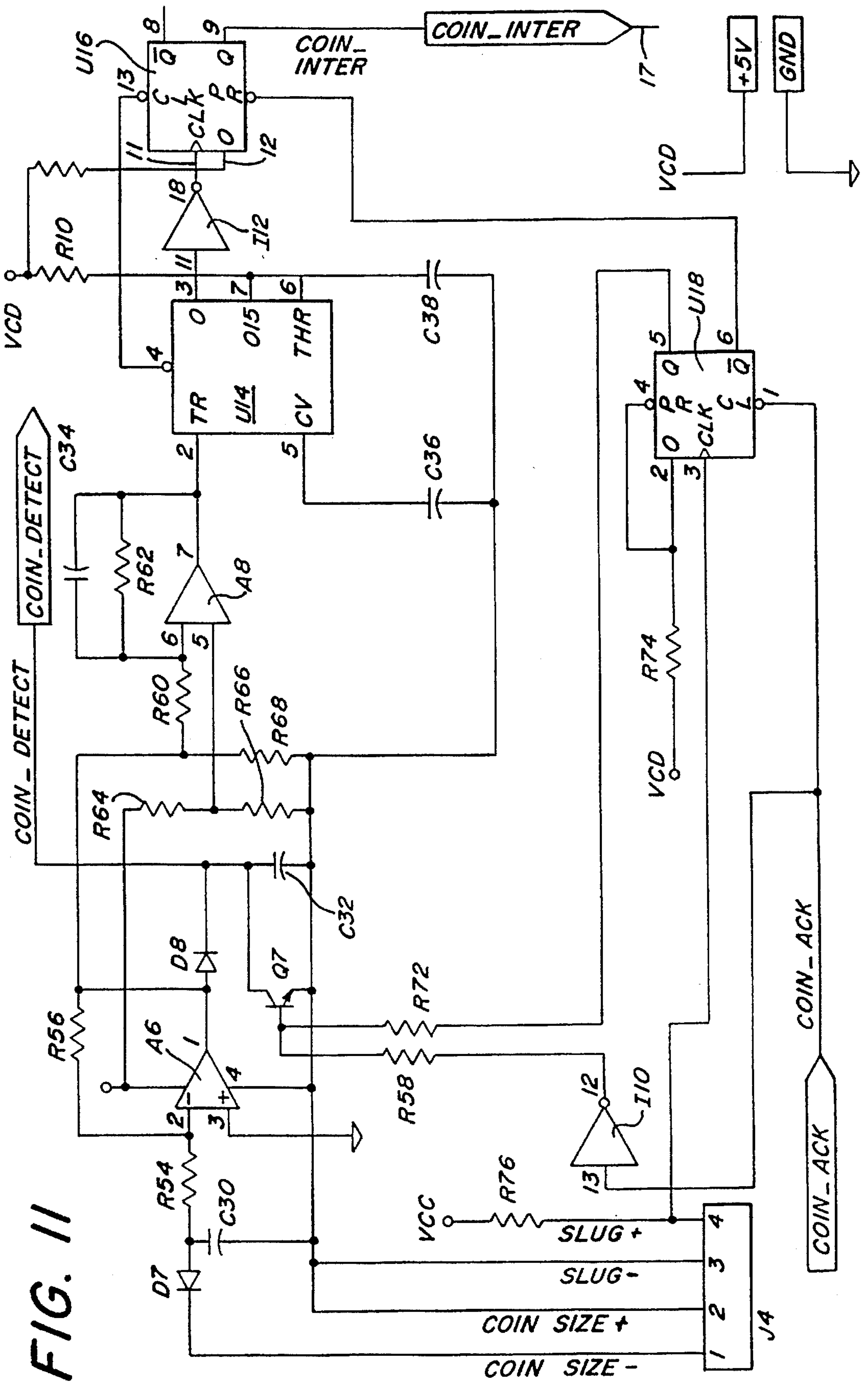
FIG. 11 is a schematic of the coin size and ferrite or slug determination circuitry of the parking meter.

The circuitry of the coin detector is shown in FIGS. 10 and 11. When the pre-sensor arm 30 rotates due to the presence of a coin, it will flex the Piezo strip 44, causing the coin detection voltage to appear at connector J3 (see FIG. 9). The voltage is applied to pin 2 of operational amplifier A2 through resistor R38 (33K). A resistor R40 (9.1M) is connected between pins 2 and 1 of amplifier A2. The ratio of the resistors R38 and R40 set the gain of the amplifier A2. The output of A2 on pin 1 is applied to a short-term sample and hold circuit which includes diode D10, capacitor C26 (1,000 pF) and resistor R42 (3.3M). The sample and hold circuit is connected to the non-inverting input of operational amplifier A4. Resistors R44 (33K) and R46 (536K) set the gain of the amplifier A4. The output of A4 on pin 7 is applied through a second sample and hold circuit comprising diode D9, capacitor C28 (0.33 uF) and resistor R48 (10M). The output of this circuit turns on transistor Q8 which then turns on transistor Q9 applying power to the main coin detect circuit (VCD). Resistors R50 (220K) and R52 (1K) limit current flow through the transistors Q8 and Q9.

Referring now to FIG. 11, the circuitry associated with the determination of coin size and the ferrous content of the coin (i.e., slug) will be explained. When the coin deflects the size measurement arm 46, this flexes Piezo strip 56. The Piezo strip 56 will put out a voltage proportional to the amount and speed of the bend. Since the rate of change of the measurement is more consistent as the coin leaves the slot, the diameter of the coin is measured as the Piezo strip 56 snaps back. As with the Piezo strip 44 for the predetector, the Piezo strip 56 not only senses the presence of the coin, but it also measures the size or diameter of the coin.

It should be noted here that this preferred embodiment only measures the diameter of the coin, because in the United States the diameter of the coin is unique for each denomination of coin. However, in certain countries such as Great Britain, it may be necessary to add a second coin size sensor to detect the thickness of the coin, because the coinage includes coins of different denominations which have the same diameter but different thicknesses. For installation in such a country, another deflection arm and Piezo strip would be added to further determine the value of the coin.

Referring again to FIG. 11, the coin diameter detector is connected to the detection circuit through connector J4 to an input filter comprised of diode D7 and capacitor C30 (3,300 pF). Resistors R54 and R56 (2.7M and 2.1M, respectively) set the gain of operational amplifier A6. The output of operational amplifier A6 on pin 1 is applied to sample and hold circuit D8 and C32 in order to generate (COIN DETECT) which is applied through diode D8 to pin 20 of processor/LCD 102 chip U6. This input is set up as an A/D converter until the micro-controller acknowledges that it has received the data by making pin 35 (COIN ACK) low.

The COIN ACK signal is applied to invertor I 10 at pin 13. The output of the invertor I 10 at pin 12 is connected to the base of transistor Q7 through resistor R58 (10K). This turns on transistor Q7 and discharges capacitor C32 (1 uF) in preparation for the next coin.

The coin size signal from amplifier A6 is also applied through resistor R60 (51K) to operational amplifier A8. The combination of resistor R60 and resistor R62 (10M) set the gain of amplifier A8 with capacitor C34 (330 pF) providing low pass filtering. This stage is used as a comparator with the divider comprising R64 (10K) and R66 (2.2K) being used to provide a reference point. R68 (100K) provides the proper input voltage to pin 6 of amplifier A8 through resistor R60.

The output of A8 at pin 7 is used to fire a one shot multi-vibrator comprising chip U14, capacitors C36 and C38 (each 0.01 uF) and resistor R70 (100K). The one-shot multi-vibrator provides a delay to allow the sample and hold circuit to stabilize. The output of the one shot at pin 3 is inverted through I12. The output of I12 at pin 18 provides a clock input at pin 11 of a flip flop U16. The flip flop output at pin 9 is sent out as the COIN INTER signal to the processor/LCD 102 pin 17. This signal will interrupt the processor/LCD 102 and tell it to look at the value of the COIN DETECT signal at pin 20. When the processor/LCD 102 processes the COIN DETECT signal, it will return the COIN ACK signal.

The third detector of the system, in addition to the predetection and the coin size determination, is the ferrous metal detector. This detector comprises the permanent magnet 66 on one side of the coin slot and the reed switch 68 on the other side of the coin slot. The reed switch 68 is normally held closed by the field created by the magnet 66. When a coin with ferrous material, such as a slug, is deposited in the meter, it will pass between the magnet 66 and the reed switch 68 shorting out the magnetic field and releasing the reed switch 68. The connections 70 to the reed switch are applied to pins 3 and 4 of the connector J4 to the clock input of U18 at pin 3. When the reed switch 68 is released, U18 output at pin 5 will, through resistor R72 (10K) turn on transistor Q7 which will discharge C32. At the same time, U18 pin 6 will set COIN INTER U16. With C32 discharged, the COIN DETECT signal will be zero and the microcontroller will treat it as if it has no COIN DETECT but will return a COIN ACK signal to reset the COIN DETECT circuitry. Resistor R74 at pins 2 and 4 of U18 is a pull up resistor. The voltage for the slug signal is applied through resistor R76 (470K).

Figure 12:
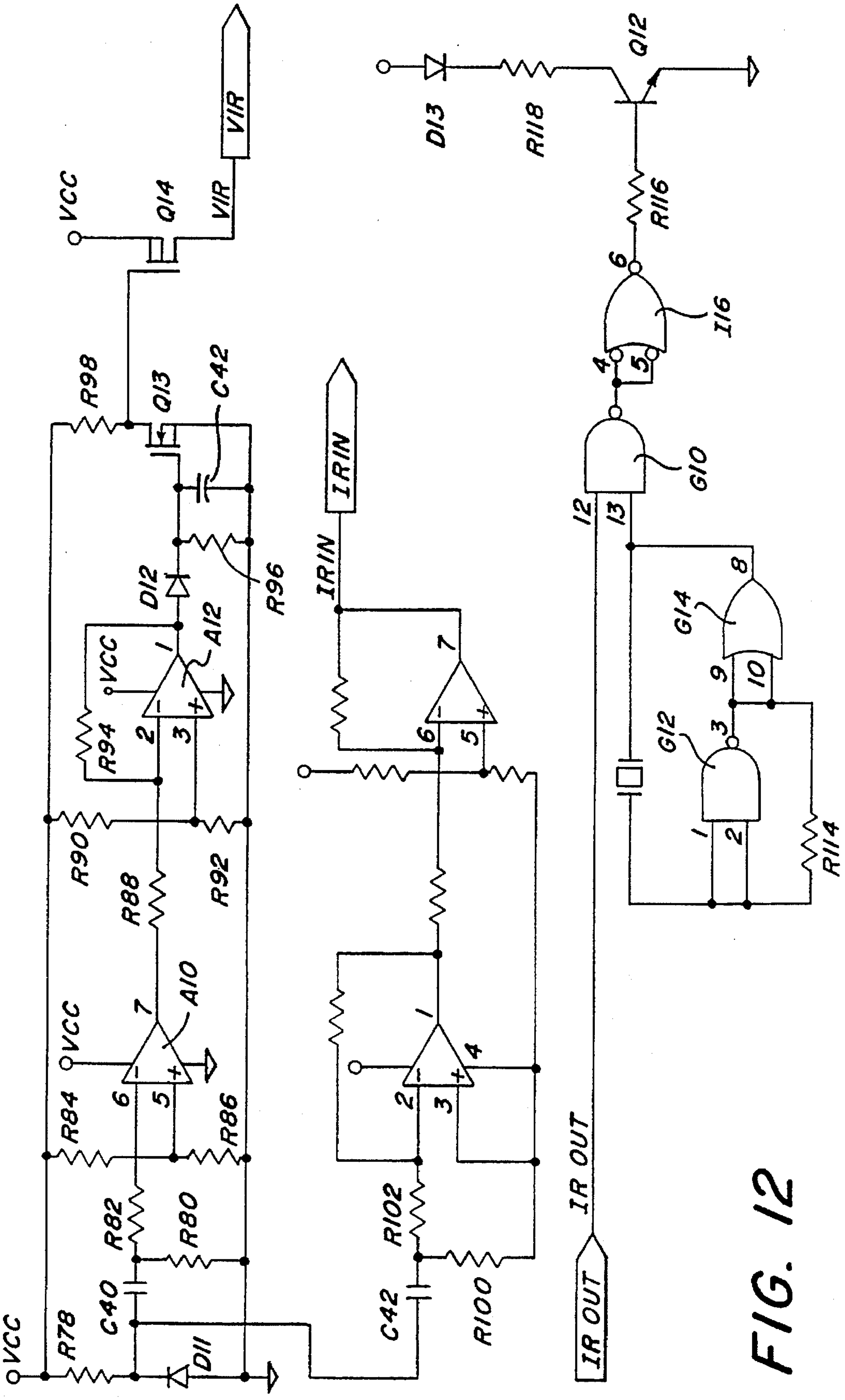
FIG. 12 is a schematic of the infra-red transceiver circuitry of the parking meter.

The circuitry for the infra-red transceiver is shown in FIG. 12. The parking meter 2 never initiates an infra-red transmission. The processor/LCD 102 waits for reception from an external transmitter. In order to save power, the power is normally automatically removed from the transceiver. The energy from the first byte received by the infra-red detector is used to turn on the power to the infra-red transceiver.

Diode D11 and resistor R78 (220K) form an infra-red detector. When an external infra-red transmitter sends data to the parking meter, the infra-red detector will send the data to both the power switch and to the infra-red receiver. The power to the infra-red receiver is turned off prior to receiving of the signal. Therefore, the first byte of data is sent through capacitor C40 (1 uF) to block the DC component. The signal is then applied to a bleeder resistor R80 (100K). It is then sent to a comparator A10 through resistor R82 (10K). The resistor divider R84 and R86 (470K and 3.9K, respectively) sets the acceptance point of the comparator A10.

The output of A10 on pin 7 is then sent to an operational amplifier A12 through resistor R88 (1.5K). The ratio of the resistors R88 and R94 (470K) set the gain of the operational amplifier A12 and the divider R90 and R92 (100K and 220K, respectively) determine the set point of the amplifier. The output of A12 at pin 1 is applied to a sample and hold stage made up of diode D12, resistor R96 (22M) and capacitor C42 (1 uF). The resistor R96 sets the decay time of the sample and hold circuit and therefore, the length of time that power is applied to the infrared receiver. The sample and hold circuit is used to turn on transistor Q13. Resistor R98 (220K) limits the current through the transistor Q13 when it is turned on. When transistor Q13 is turned on, it turns on transistor Q14 which applied voltage, VIR, to the infra-red transmitter and receiver.

The sample and hold circuit is set to apply power for ten seconds after the last received data. As a result of the above process, the received first byte of data is lost, therefore, the infra-red transmitter must always begin the first transmission with a dummy byte of data.

After the power is applied to the transceiver, the rest of the received data is sent to the infra-red receiver through capacitor C42 (1 uF) and resistors R100 and R102 (100K and 732K, respectively) to amplifier A14 which constitutes the first stage of the infra-red receiver. The ratio of R102 and R104 (3.3M) sets the gain of the amplifier A14. The output of amplifier A14 at pin 1 is applied to the second amplifier of the infra-red receiver, A16, through resistor R106 (10K). The ratio of resistors R106 and R108 (1M) sets the gain of the amplifier A16 and the divider R110 and R12 (220K and 1M, respectively) sets the operational point of the amplifier A16. The output of amplifier A16 at pin 7 generates a logic level which is sent to the processor/LCD 102 as IRIN at pin 16. (See FIG. 8*a*).

After the processor/LCD 102 receives data on IRIN, it can send data out to an external receiver as IROUT at pin 33 (See FIG. 8*a*).

Referring again to FIG. 12, the IROUT signal is sent to AND gate G10 at pin 12. A 50 KHZ oscillator, comprising tuning fork Y4, gates G12 and G14, and resistor R114 (470K) provides an output to pin 13 of gate G10. Since IROUT is high for a space and low for a mark, the 50 KHZ signal is sent out for spaces only because during the mark, the infra-red transmitter is turned off.

The output of gate G10 is sent to input pins 4 and 5 of invertor I16. The output of invertor I16 at pin 6 is applied to a resistor R16 (10K) in the base of transistor Q12. This turns on the transistor Q12 which pulls current through limiting resistor R118 (1K) and infra-red transmitter diode D13. The current turns on diode D13 which transmits the data.

Figure 13:
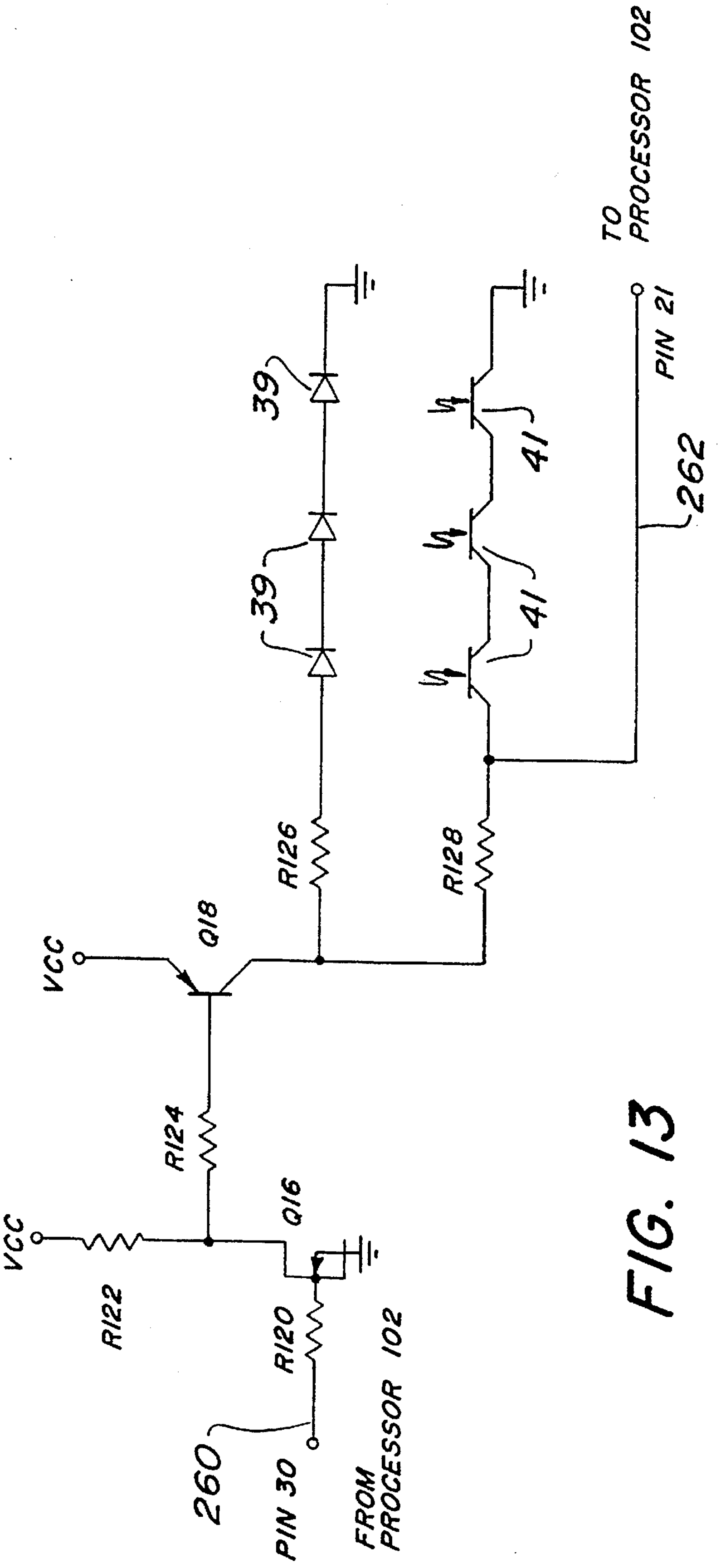
FIG. 13 is a schematic of the coin jam detection circuitry of the parking meter.

The coin jam circuitry is shown in FIG. 13. An input is received on line 260 from pin 38 of the processor/LCD 102 which provides a high voltage when the processor wishes a jam detection check to be made and a low voltage when the jam detector is not operated. When pin 38 goes high, voltage is applied to the base of transistor Q16 through resistor R120 (1K). Transistor Q16 conducts through limiting resistor R122 (220K), decreasing the voltage applied through resistor R124 (10K) to transistor Q18, causing the transistor Q18 to conduct. Voltage is thereby applied to resistor 126 (330 ohms) to the IR diode emitters 39. In addition, voltage is applied through resistor 128 (1M) to photo-electric cells 41. If there is a jam, and any one of the photo-electric cells 41 does not receive light from its associated IR diode emitter 39, the photoelectric cell 41 stops conducting thereby breaking the connection to ground on line 262. This causes line 262 which is connected to pin 21 of the processor to go high, indicating to the processor/LCD 102 that a jam has occurred.

The processor/LCD 102 checks for a jam in two circumstances. Each time a coin is detected, a jam check is made.

Also, if a car is detected and no coin is inserted into the slot after a predetermined time period (which typically may be in the range of 2 to 5 minutes and is selectable by the parking authority) a jam detect check is made.

Figure 14:
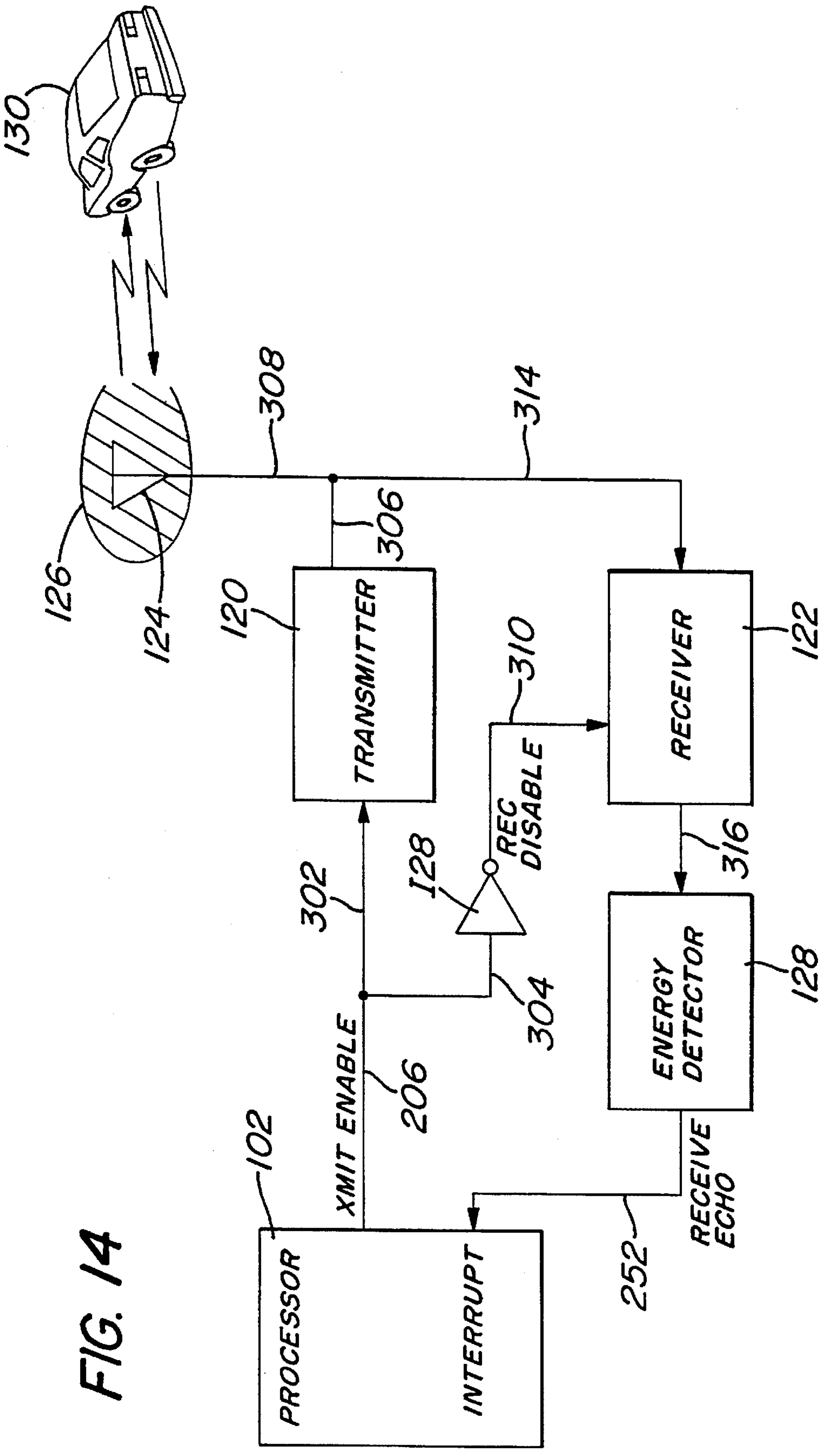
FIG. 14 is a block diagram of an alternative embodiment of the auto detector employing an R.F. transmitter and receiver (radar).

An alternative embodiment of the auto detect circuit is shown in block diagram form in FIG. 14. The auto detect circuit comprises a RADAR (RADIO DETECTION AND RANGING) system with an R.F. transmitter 120, R.F. receiver 122, an antenna 124, a shield 126, and an energy detector 128 connected to the output of receiver 122. The shield 126 focuses the R.F. power radiated by the antenna 124 onto a vehicle 130.

This alternative embodiment of the auto detect circuit operates in a fashion similar to the auto detect circuit of the first embodiment as previously described, except that in this alternative embodiment, a radar system comprising an R.F. transmitter and receiver are used rather than an ultrasonic transceiver of the previous embodiment.

The processor 102 transmits an XMIT ENABLE signal on line 206. This signal is sent the input of transmitter 120 on line 302 and to the input of invertor I28 on line 304. The XMIT ENABLE signal, enables the transmitter 120 to transmit a pulse or burst of R.F. energy on line 306 and then, via line 308 to the antenna 124. The shield 126 focuses the R.F. power output from antenna 124 to provide a narrow beam which impinges upon the vehicle 130.

In order to protect the receiver 122 which has a common connection to the output of the transmitter 126, the output of the invertor I28 transmits a REC DISABLE signal on line 310 to the receiver 122. This turns off the receiver 122 while the transmitter 120 is transmitting power. After a predetermined time period, the XMIT ENABLE signal is removed, shutting off the transmitter and the REC disable signal and again enabling receiver 122.

The return radar echo of the reflected energy from the vehicle 130 is then received by antenna 124 and transmitted to the input of the receiver 122 via lines 308 and 314. The output of the receiver 122 on line 316 is connected to the input of the energy detector 128 which transmits a RECEIVE ECHO signal to the processor 102 on line 252. The RECEIVE ECHO signal interrupts the processor so that the processor can calculate the time between the XMIT ENABLE and the RECEIVE ECHO which is a indication of the distance of the vehicle from the parking meter.

The electronic parking meter system is specifically designed for extremely low power operation. This allows the system to carry out all of its functions with a power source of commercially available, non-rechargeable volt batteries. Test results to date indicate that battery replacement will only be required at intervals of approximately one year or longer. The required savings in power is accomplished in two ways. As previously described, the coin sensing and detection circuitry is novel and requires much less power than the circuits and designs used in existing coin detection devices. The coin size detector 34 and the pre-sensor 30 comprise Piezo strips 44 and 56, respectively, which require zero power to operate because the Piezo strips generate power. The slug detector 32 comprises a permanent magnet 66 and reed switch 68 and requires only 10 micro-amps to operate a pull up circuit. Secondly, the system is designed to operate under various states or conditions which minimize overall power requirements. For example, in the off-state, during off hours, the liquid crystal display and the flasher equipment is turned off, and the processor is in the inactive or sleep mode. In addition, the infra-red transceiver is in the inactive mode. Also, as previously described, the detection of a coin in the coin slot activates the processor and the rest of the coin detection equipment.

During the day in the inactive state with no car in the parking position at the meter, the coin detect pre-sensor is operable, the liquid crystal display is operating displaying general information regarding the parking hours and the amount of allowable time for each coin and the sonar transducer is operable as is the awakening circuitry of the IR transceiver. The flashing circuitry is dormant. As previously described, the sonar transducer is only turned on every 10 to 15 seconds for a few microseconds. It generates a half millisecond pulse and then waits for possibly 50 milliseconds for a return echo.

The next state, the active state, occurs when a car arrives at the parking slot at the meter. If a car is detected, the computer is activated and keeps track of how long the car is there. After a predetermined amount of time (2–5 minutes) if no coin has been detected, the flasher circuitry operates.

For the coin denomination determination, a look-up table in the processor may be used which gives the voltage for each size coin as a function of battery level and temperature.

The equipment can be fabricated using standard off-the-shelf components and parts. A listing of exemplary components is given below:

(1) The processor can be the SGS-Thompson microelectronics processor, Model #ST6240 or equivalent.

(2) The sonar transducer can be the Polaroid electrostatic transducer, Model #7000 or equivalent.

(3) The operational amplifiers can be the Precision Monolithics, Inc. amplifiers, Model #OP-290 or equivalent.

(4) The liquid crystal display can be the Standish Industries, Inc. display, Model #LCD4228 or equivalent.

Average current draw for the day and night time and the average current draw over 24 hours is given below:

| DAY: (Average for 12 hour day) | |
|---|---|
| Auto Detect | 100 μA |
| LCD Display | 200 μA |
| Flasher | 100 μA |
| COin Detect | 10 μA |
| Infra-red Transmit & Receive | 40 μA |
| Processor | 100 μA |
| Total Average Daytime Power | 550 μA |
| NIGHT: (Average for 12 hour night) | 200 μA |
| AVERAGE CURRENT DRAW OVER 24 HOURS = (550/2) + (200/2) | 375.5 μA |

On an overall basis, it is estimated that the system will draw an average of approximately 300–500 uA which need can be met with 4 commercially available alkaline type C 1.5 volt batteries. In extremely cold weather, i.g., −10° or colder, or hot weather, e.g., 188° or higher, lithium batteries would be used. The batteries at this power requirement only require replacement at intervals of approximately one year or longer.

At a prescribed interval (typically one week), a parking authority auditor carrying a hand-held computer with an IR transceiver interrogates each parking meter in turn. When the parking meter is interrogated via its IR receiver, it will transmit and download to the hand-held computer of the auditor information relating to the operation of the meter since the last interrogation. The information will include the following:

(1) The serial number of the parking meter;

(2) The total revenue received by the parking meter;

(3) A count of the number of parked cars detected by the parking meter;

(4) The total of the amount of parked time bought;

(5) The number of expirations of time;

(6) The total expired time;

(7) The cars leaving with time remaining;

(8) The amount of time paid for but not used;

(9) Low battery indicator, the presence of a jam, or other equipment failures detected within the meter.

Upon completion of the rounds, the auditor returns to a central headquarters where the information received from each parking meter is downloaded into a central computer so that the amount of monies due for each meter, and other operational information regarding the meter can be record. This will provide a tight control on the amount of monies taken in and the amount of monies saved by resetting the meters when vehicles leave the meter location with unexpired time. Furthermore, the system can gauge the effectiveness of the operation of the parking enforcement officers by comparing the number of expirations and the amount of expired time with the number of parking tickets issued at each parking meter.

In addition to operational data concerning the parking meter, the information is useful to dispatch maintenance personnel in case of coin jams, and other equipment failures, or to replace batteries when low battery indications are found.

The system can also include the use of the hand-held computer with an IR transceiver by parking enforcement officers. In this case, when tickets are issued, the information relating to the ticket, i.e., ticket number, license number, date, time and amount of overtime parking, can be inserted into the storage of the processor/LCD 102 so that when the auditor downloads the information stored by the processor, it will be included. Furthermore, the hand-held computer can be loaded with the license numbers of scofflaws or the license numbers of stolen cars. The parking enforcement officer can enter the license of a parked car into the hand-held computer which will indicate whether the vehicle belongs to a scofflaw or is a stolen vehicle. If this is the case, the parking enforcement officer can use a hand-held R.F. radio to communicate with headquarters so that the car can be booted.

An electronic parking meter has been described with very low power requirements which provides an electronic display, a processor which controls the operation of the meter, an electronic means to determine the presence of a vehicle, and an IR transceiver for communicating with auditors or other parking authority officers, and a unique coin detection system which is simple, reliable and requires very little power. The meter can perform all the above functions with standard, off-the shelf, non-rechargeable batteries. The power drain is so small that the batteries will last approximately one year or longer before replacement is required.

Without further elaboration, the foregoing will so fully illustrate my invention, that others may, by applying current or future knowledge, readily adapt the same for use under the various conditions of service.

I claim:

1. A vehicle detector system for a parking meter comprising a processor having an input and an output, an R.F. transmitter having an input and an output, a R.F. receiver having a first and a second input and an output, said processor output being connected to said transmitter input and to said first input of said receiver, an antenna connected to said transmitter output and to said receiver second input and an energy detector having an input and an output, said energy detector input being connected to said receiver output and said energy detector output being connected to said processor input and said antenna transmitting a beam of R.F. energy for detecting a vehicle, as well as for detecting all objects that may come between said vehicle detector system and the vehicle.

2. The vehicle detector of claim 1 wherein said processor comprises means to provide a transmitter enable signal, periodically and for a predetermined period of time, which is connected to said transmitter input, said transmitter output remaining electrically coupled to said receiver second input independent of said transmitter enable signal.

3. The vehicle detector system of claim 2 further comprising an invertor having an input and a output, said invertor input being connected to said processor output and said invertor input being connected to said receiver first input, said invertor providing an inverted transmitter enable signal to said receiver first input.

4. The vehicle detector system of claim 3 wherein said receiver further comprises means for disabling said receiver, responsive to said inverted transmitter enable signal, for said pre-determined period time.

5. The vehicle detector of claim 4 wherein said transmitter further comprises means for transmitting a burst of R.F. energy, responsive to said transmitter enable signal, for said pre-determined period of time.

6. The vehicle detector of claim 5 wherein said receiver comprises means for receiving an echo from a vehicle upon which said beam impinges and for providing a second signal, responsive to said echo, to said energy detector.

7. The vehicle detector system of claim 6 wherein said energy detector comprises means for providing a received echo signal to said processor input.

8. The vehicle detector system of claim 7 wherein said processor comprises means for calculating the distance of the vehicle from said parking meter based upon the elapsed time between the transmitting of said beam and the receipt of said echo.

9. The vehicle detector of claim 1 further comprising a means for shielding said beam of the R.F. energy transmitted and received by said antenna.

10. The vehicle detector of claim 9 wherein said processor comprises means to provide a transmitter enable signal, periodically and for predetermined period of time which is connected to said transmitter input, said transmitter output remaining electrically coupled to said receiver second input independent of said transmitter enable signal.

11. The vehicle detector system of claim 10 further comprising an invertor having an input and a output, said invertor input being connected to said processor output and said invertor input being connected to said receiver first input, said invertor providing an inverted transmitter enable signal in inverted form to said receiver first input.

12. The vehicle detector system of claim 11 wherein said receiver further comprises means for disabling said receiver, responsive to said inverted transmitter enables signal, for said pre-determined period time.

13. The vehicle detector of claim 12 wherein said transmitter further comprises means for transmitting a burst of R.F. energy, responsive to said transmitter enable signal, for said pre-determined period of time.

14. The vehicle detector of claim 13 wherein said receiver comprises means for receiving an echo from a vehicle upon which said beam impinges and for providing a second signal, responsive to said echo, to said energy detector.

15. The vehicle detector system of claim 14 wherein said energy detector comprises means for providing a received echo signal to said processor input.

16. The vehicle detector system of claim 15 wherein said processor comprises means for calculating the distance of the vehicle from said parking meter based upon the elapsed time between the transmitting of said beam and the receipt of said echo.

* * * * *